Dec. 23, 1969  G. R. ARITA  3,485,163
STEAM COOKER
Filed Feb. 28, 1968
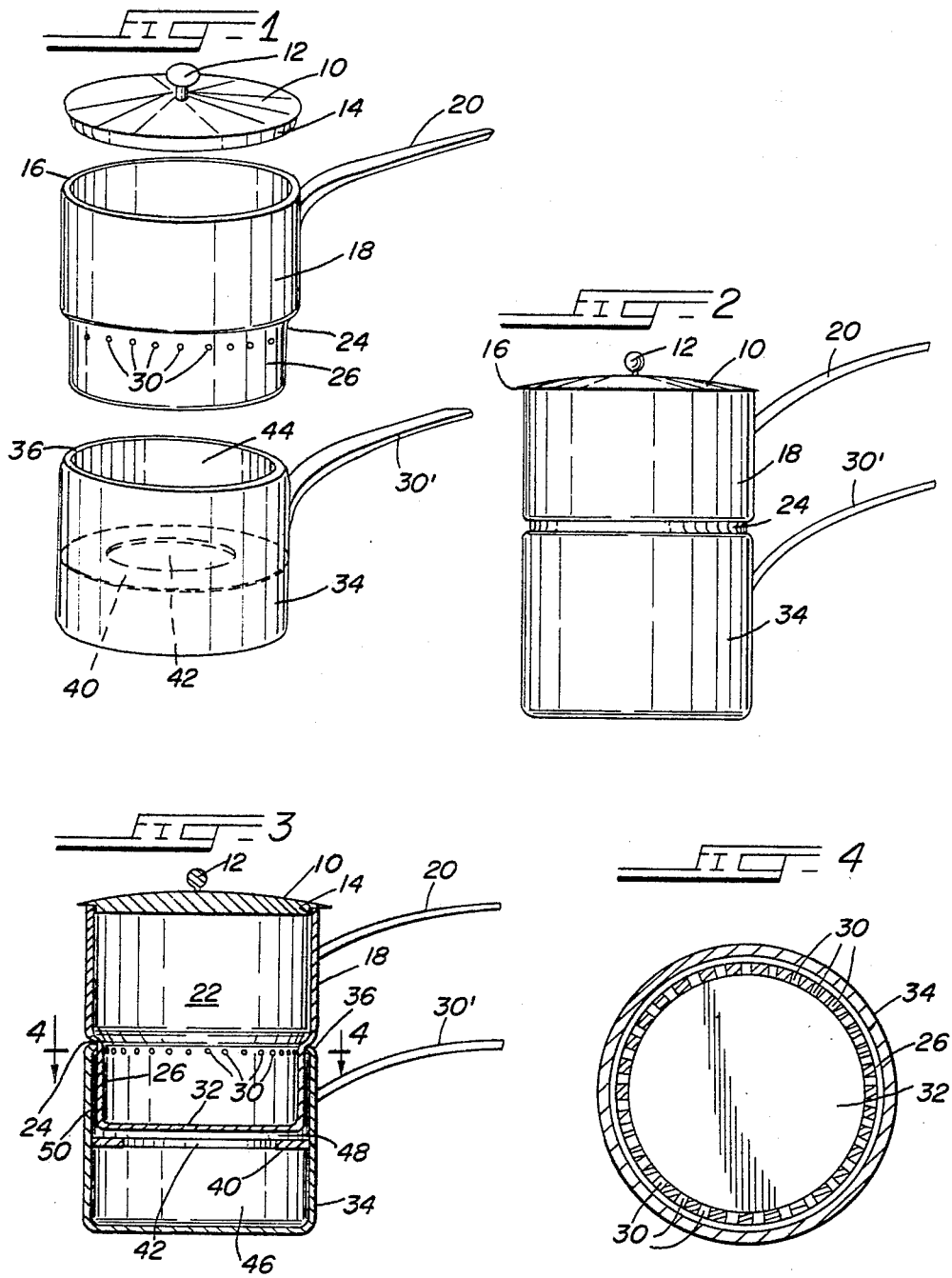
INVENTOR.
GEORGE R. ARITA United States Patent Office 3,485,163
Patented Dec. 23, 1969

3,485,163
STEAM COOKER
George R. Arita, 2908 N. Burling St.,
Chicago, Ill. 60657
Filed Feb. 28, 1968, Ser. No. 708,888
Int. Cl. A47j 27/06, 27/04, 36/38
U.S. Cl. 99—413       5 Claims

ABSTRACT OF THE DISCLOSURE

A steam cooking vessel of the double boiler type characterized by provision of a food receptacle having a lower off-set wall portion which nests within a water receptacle and a radial baffle is provided in the water receptacle spaced from the bottom of the nested food receptacle whereby a vapor heating zone is provided therearound and the upper portion of the heating zone is in communication with the inside of the food receptacle through a series of openings in the top part of the off-set wall portion. By these means condensate carry-over is prevented from entering the food receptacle.

Background of the invention

It is known to provide steam cooking vessels to include a lower water receptacle and a top food receptacle removably mounted or nested therein with a suitable cover for the food receptacle. In some steam cooking vessels the bottom, sides or both of the food receptacle are perforated to allow steam to enter the inside of the food receptacle and also to allow water, i.e., condensate to drain out. A number of different baffle arrangements are provided, on the underside of the cover, above the food receptacle, or in the form of inner downwardly depending lips and as secondary circumferential concentric perforated walls around the food receptacle.

The purpose of a double boiler is to heat the food in a receptacle indirectly through the production of steam which envelops the food receptacle and loses heat to its outer walls. This prevents charring of the food. The heating of meats and vegetables and rice, particularly frozen foods or foods which are left-overs that have been partially dehydrated, requires both the controlled amount of indirect heat provided by the double boiler and controlled amounts of moisture in the atmosphere above and surrounding the food so they do not become dry and tasteless in the cooking or reheating process. It is also known to allow part of the steam to enter the food receptacle. However, the introduction of too much steam directly into the food receptacle produces condensation therein, prolongs the heating time and the food becomes soggy and unappetizing.

It is an object of this invention to provide a cooking utensil wherein food can be heated and simultaneously steamed under controlled conditions to overcome these problems, shorten the cooking time and produce a cooked or heated food having the proper amount of moisture. Another object of this invention is to provide a double boiler-type cooking utensil which overcomes the drawbacks of the prior art devices wherein either too little or too much water condensate is introduced into the food receptacle. Also this invention provides a cooking utensil which is of simple construction, easy to clean and maintains the proper moisture content of the food as well as providing the maximum heating rate for the food with a given rate of water evaporation.

Summary of the invention

This invention concerns a cooking utensil of the double-boiler type with an upper food receptacle and suitable cover, an inwardly off-set lower portion integral with the food receptacle having a series of holes in the side wall spaced above the bottom of the food receptacle and a lower vessel to receive the food receptacle with its upper rim engaging the off-set of the food receptacle and providing a circumferential radial flange adjacent and spaced from the bottom of the food receptacle which prevents the entrance of water condensate into the steam heating area. By these means the food receptacle surrounded by an annular and transverse heating zone space and the port of entry of steam into the food receptacle is at the top of the annular zone so that condensate carry-over is minimized or eliminated. Thus, not only is the amount of water vapor entering the food receptacle controlled but the steam does not enter the food receptacle until the heating process is well along and the carry-over of excessive amounts of condensate in the food receptacle is avoided. The radial baffle in the lower heating vessel is so spaced from the annular heating zone opening that condensate or splashing water due to ebullition in the steam-producing process is prevented from entering the annular heating space or the openings. By these means only controlled amounts of live steam enter the food receptacle.

Description of the drawings

A preferred embodiment of this invention is shown in the drawings wherein:

FIG. 1 is an exploded view showing the parts of the utensil of this invention in perspective;

FIG. 2 is a side elevational view of the cooking utensil of this invention with the parts shown in FIG. 1 in assembled form; and FIG. 3 is a vertical cross-sectional view of FIG. 2.

FIG. 4 is a cross-sectional view taken on the line 4—4 of FIG. 3.

The preferred embodiment

Referring to the drawings, the cooking device of this invention is shown to comprise a cover 10 having a handle member 12 and a rim 14 which overlaps the edge 16 of the generally cylindrical food receptacle 18 provided with the handle 20. The receptacle 18 provides a food compartment 22 having an inwardly off-set shoulder 24, connected to the generally cylindrical lower wall 26 which is provided with a series of spaced circumferentially arranged apertures 30 just under the shoulder 24. The remaining portions of the wall 26 and the bottom wall 32 of the food receptacle are continuous and devoid of perforations.

The lower water receptacle 34 has an upper inwardly extending rim or lip 36 adapted to engage the shoulder 24 when the parts are assembled as shown in FIGS. 2 and 3. The lower vessel 34 is also generally cylindrical and is provided with a handle 30.

The lower water receptacle 34 has the radial circumferential baffle 40 having or defining a central opening 42 which partially separates this vessel into a heating zone 44 (FIG. 1) and a lower zone 46 which latter will contain the water to produce the steam for the cooking or heating process. The baffle 40 is placed at a distance from the lip 36 which is greater than the distance from the off-set shoulder 24 to the bottom 32 by an amount sufficient to provide the space 48 between the baffle 40 and bottom 32. The off-set 24, in turn, also provides for the annular space 50 between the part of the wall 26 and the inner wall of the vessel 34. The apertures 30 are spaced sufficiently below the off-set 24 so that the rim or lip 36 engages the wall 26 just above same and does not interfere with the passage of steam therethrough. This spacing is adjusted and the rim 36 so shaped as to place, in the assembled condition of the utensil, the apertures at or near the top of the annular space 50. This eliminates the formation of condensate above the apertures 30 and prevents or minimizes condensate being carried into the zone 22.

The operation of the device of this invention is as follows: Food is placed in the compartment 22 of the vessel 18 to any desired height therein if entirely solid in form. Where liquids are being treated the liquid level will be below the apertures 30. Water is placed in the zone 46 and heat is applied. As steam is produced, it travels around the baffle 40 and enters the annular spaces 48 and 50. Condensate from both walls 26 and 32 returns to the top of the baffle and back through the opening 42 into the zone 46. The wall 26 and the bottom 32 become heated as well as the food therein. The condensate forming area gradually rises in the annular space 50 and eventually steam passes through the apertures 30 and into the zone 22. This zone is by this time partially heated and only part of the steam entering the zone 22 will be condensed and provide moisture for the food. As soon as equilibrium conditions of steam production from the zone 46 and condensate return from the annular space 50 are reached and the interior of zone 22 has reached approximately the boiling point of the water, practically no condensate will reach the top of the space 50 and the zone 22 will be saturated with a steam and hot air mixture. Ebullition under the cover 10 prevents the formation of pressure in the vessel.

In one embodiment of this invention the baffle 40 has a radial width which is greater than the radial width of the annular space 50 so that a tortuous path is presented to the passage of water and water vapor. This assures that the carry-over of boiling water into the space 50 is prevented. Also the space 48 between the bottom 32 of the food receptacle and the baffle 40 is at least as great as the radial width of the annular space 50. Although the openings 30 can be of any size and number it is preferable that they be confined to the top part of the wall 26 and that the total effective fluid flow area of the openings be less than the fluid flow area of the annular space 50.

While this invention has been described fully and completely with special emphasis upon a preferred embodiment, it is to be understood that within the scope of the appended claims this invention may be practiced otherwise than as specifically described.

What is claimed is:
1. A steam cooking utensil comprising:
    (a) a water receptacle having a side wall with a top opening defined by an inwardly directed circumferential lip;
    (b) a radial circumferential baffle extending from and integrally secured to the said side wall of said water receptacle and spaced from said lip;
    (c) a food receptacle having an inwardly off-set wall portion adapted to nest within said water receptacle with said lip engaged by the offset, the nested walls defining an annular space therebetween and the bottom of said food receptacle being spaced above said baffle; and
    (d) a series of openings through the lower wall portion of said food receptacle and communicating with said annular space, the total area of said openings being less than the fluid flow area of said annular space.
2. A steam cooking utensil in accordance with claim 1 in which:
    (a) said openings are adjacent said offset and in communication only with the upper end of said annular space.
3. The device according to claim 2 wherein said openings are solely in a single row in a horizontal plane.
4. A steam cooking utensil in accordance with claim 1 in which:
    (a) said baffle has a radial width greater than the radial width of said annular space.
5. A steam cooking utensil in accordance with claim 1 in which:
    (a) the space between said bottom of said food receptacle and said baffle is at least as great as the radial width of said annular space.

References Cited

UNITED STATES PATENTS 2,081,751   5/1937   Lendrum et al. ____ 99—413 XR

FOREIGN PATENTS 854,124   11/1960   Great Britain.

WALTER A. SCHEEL, Primary Examiner

J. M. BELL, Assistant Examiner

U.S. Cl. X.R.

126—369